US008385671B1

(12) United States Patent  
Batur

(10) Patent No.: US 8,385,671 B1  
(45) Date of Patent: Feb. 26, 2013

(54) DIGITAL CAMERA AND METHOD

(75) Inventor: Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 788 days.

(21) Appl. No.: 11/677,846

(22) Filed: Feb. 22, 2007

Related U.S. Application Data

(60) Provisional application No. 60/776,475, filed on Feb. 24, 2006.

(51) Int. Cl.  
*G06K 9/40* (2006.01)

(52) U.S. Cl. .................... 382/254; 382/263; 382/264

(58) Field of Classification Search ............ 331/32; 345/234, 235, 236, 238, 396.1, 609, 610; 348/533, 607, 618, 666, 683, 701, E7.052, 348/908; 382/263, 264, 270; 702/17, 191, 702/193, 195, FOR. 166  
See application file for complete search history.

(56) References Cited

U.S. PATENT DOCUMENTS

| | | | | |
|---|---|---|---|---|
| 5,329,360 A * | 7/1994 | Gillard et al. | ............... | 348/472 |
| 6,070,133 A * | 5/2000 | Brewster et al. | ............... | 704/9 |
| 6,442,298 B1 * | 8/2002 | Nixon | ............... | 382/248 |
| 6,597,394 B1 * | 7/2003 | Duncan et al. | ............ | 348/222.1 |
| 7,151,858 B2 * | 12/2006 | Kyong | ............... | 382/266 |
| 7,260,272 B2 * | 8/2007 | Lin et al. | ............... | 382/275 |
| 2002/0061062 A1 * | 5/2002 | O'Brien | ............ | 375/240.01 |
| 2002/0074499 A1 * | 6/2002 | Butler | ............ | 250/338.1 |
| 2004/0264915 A1 * | 12/2004 | Adams et al. | ............... | 386/4 |
| 2005/0029453 A1 * | 2/2005 | Allen et al. | ............... | 250/332 |
| 2005/0196060 A1 * | 9/2005 | Wang et al. | ............... | 382/240 |
| 2006/0023962 A1 * | 2/2006 | Hwang et al. | ............... | 382/240 |
| 2006/0132642 A1 * | 6/2006 | Hosaka et al. | ............... | 348/370 |
| 2007/0145273 A1 * | 6/2007 | Chang | ............ | 250/338.1 |
| 2009/0226030 A1 * | 9/2009 | Picard et al. | ............... | 382/100 |

* cited by examiner

*Primary Examiner* — Gregory F Cunningham  
(74) *Attorney, Agent, or Firm* — Mirna Abyad; Wade J. Brady, III; Frederick J. Telecky, Jr.

(57) ABSTRACT

Image noise reduction filtering by low-pass/high-pass filtering to get a hierarchical representation, modifying coefficients in each hierarchy level for noise suppression, and the modified level combination to yield a noise-filtered image. The noise suppression within levels preserves edges which the representation preserves.

3 Claims, 6 Drawing Sheets

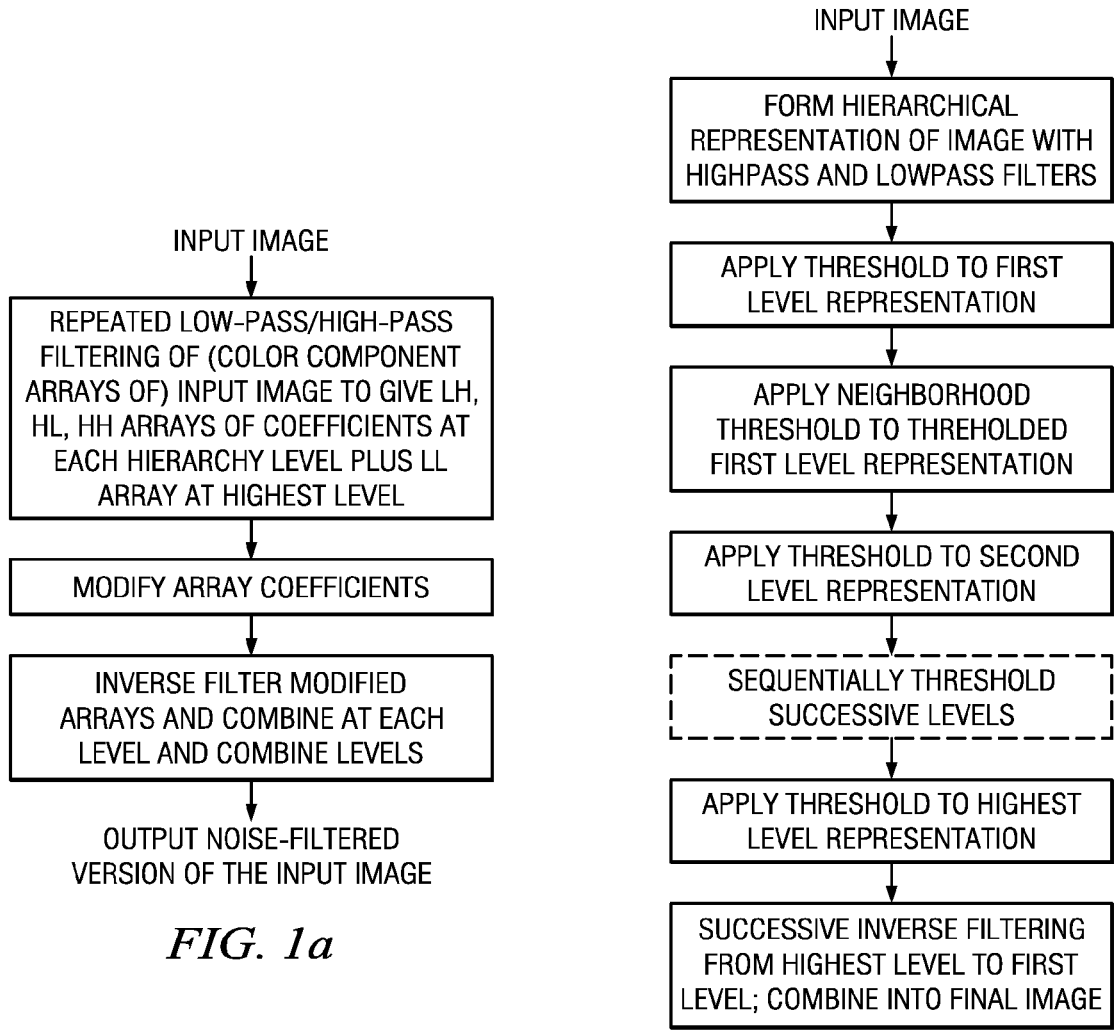
FIG. 1a
FIG. 1b
FIG. 1c

ORIGINAL

FILTERED

ORIGINAL

FILTERED

DIGITAL CAMERA AND METHOD

CROSS-REFERENCE TO RELATED APPLICATIONS

This application claims priority from provisional Appl. Ser. No. 60/776,475, filed Feb. 24, 2006. The following co-assigned, copending patent applications disclose related subject matter: provisional Appl. Ser. No. 60/820,006, filed Jul. 21, 2006.

BACKGROUND OF THE INVENTION

The present invention relates to digital video signal processing, and more particularly to architectures and methods for digital camera front-ends.

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., sensor with a 2560×1920 pixel array) provides quality offered by traditional film cameras.

FIG. 3a is a typical functional block diagram for digital camera control and image processing (the "image pipeline"). The automatic focus, automatic exposure, and automatic white balancing are referred to as the 3A functions; and the image processing includes functions such as color filter array (CFA) interpolation, gamma correction, white balancing, color space conversion, and JPEG/MPEG compression/decompression (JPEG for single images and MPEG for video clips). Note that the typical color CCD consists of a rectangular array of photosites (pixels) with each photosite covered by a filter (the CFA): typically, red, green, or blue. In the commonly-used Bayer pattern CFA one-half of the photosites are green, one-quarter are red, and one-quarter are blue.

Typical digital cameras provide a capture mode with full resolution image or audio/visual clip processing plus compression and storage, a preview mode with lower resolution processing for immediate display, and a playback mode for displaying stored images or audio/visual clips.

However, images captured under low-light with high ISO gains have significant levels of noise that reduce image quality. This problem is more severe with CMOS sensors that are frequently used in digital cameras and camera phones. To achieve acceptable quality with these images, the amount of noise should be reduced.

SUMMARY OF THE INVENTION

The present invention provides a hierarchical noise filtering method with separate coefficient modifications at different scales.

BRIEF DESCRIPTION OF THE DRAWINGS

FIGS. 1a-1c are flowcharts.

DESCRIPTION OF THE PREFERRED EMBODIMENTS

1. Overview

Figure 2A:
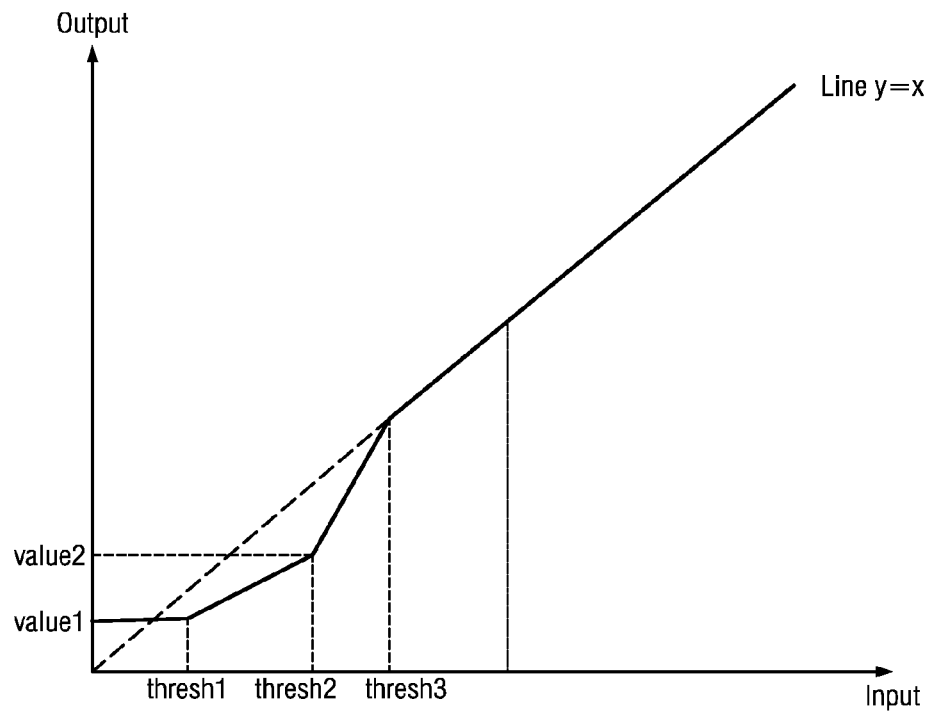
FIGS. 2a-2b are graphs of modification functions.

Preferred embodiment methods of noise reduction filtering for images (arrays) use a hierarchical representation generated with simple two-tap filters (low-pass and high-pass). This representation provides identification of the edge structure in the image with the least amount of computation. Therefore, significant levels of noise can be removed without destroying the edge structure of the image. Preferred embodiment methods also use a non-linear mapping or a thresholding scheme based on neighborhood processing at the lowest level of the representation to avoid any isolated noise patches. FIGS. 1a-1b are flowcharts of methods which include three main steps: (1) create hierarchical representation of an input image (array) as LH, HL, and HH arrays at each resolution level (analogous to a wavelet decomposition); (2) modify coefficients of each array at each level; and (3) create a noise-filtered image (array) by combination of the modified arrays.

Preferred embodiment systems (e.g., digital cameras, cellphones with cameras, et cetera) perform preferred embodiment methods with any of several types of hardware: digital signal processing (DSPs), general purpose programmable processors, application specific circuits, or systems on a chip (SoC) such as combinations of a DSP and a RISC processor together with various specialized programmable accelerators. FIG. 3b is an example of digital camera hardware. A stored program in an onboard or external (flash EEP)ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 3c.

2. First Preferred Embodiment

The first preferred embodiment hierarchical image noise filtering method achieves significant reduction in noise for high ISO images by detecting image edge structure at different scales. The methods include the three steps of creation of a hierarchical representation, modification at each level, and combination of modified levels to form the noise-filtered image. In more detail, the steps are as follows:

(1) Creation of the Hierarchical Representation

Compute a hierarchical representation of an input image by filtering an input image using the following two-tap filters:

fL=[1 1]
fH=[1 −1]

fL is a low-pass filter and fH is a high-pass filter.

These filters are applied separately for the vertical and horizontal directions. More specifically, assume that the input image is denoted by X. To create the first level of the hierarchical representation, apply the filters in the following way:

Filter X vertically by fL to create X_vL
Filter X vertically by fH to create X_vH
Filter X_vL horizontally by fL to create X_vL_hL
Filter X_vL horizontally by fH to create X_vL_hH
Filter X_vH horizontally by fL to create X_vH_hL
Filter X_vH horizontally by fH to create X_vH_hH The three arrays X_vL_hH, X_vH_hL, and X_vH_hH form the first level of the representation. Explicitly, if the pixel values of X are denoted $x_{j,k}$ with horizontal index j=0, 1, ..., J and vertical index k=0, 1, ..., K, then the corresponding coefficients of array X_vL, denoted $x^{vL}_{j,k}$, would be computed as $x^{vL}_{j,k} = x_{j,k} + x_{j,k+1}$. Also, the vertical boundary pixels, $x_{j,K}$, of the input image can be filtered by padding the image to define values for $x_{j,K+1}$. The other filterings are performed analogously to create the other arrays.

After creating the arrays of the first level, create the arrays of the second level by applying the same filtering procedure as described above but with X_vL_hL as the starting image instead of input image X. Also, modify the two-tap filters by inserting zeros to compensate for the level as follows:

fL=[1 0 1]
fH=[1 0 −1]

Explicitly, with the coefficients of X1=X_vL_hL denoted $x1_{j,k}$ and the coefficients of X1_vL denoted $x1^{vL}_{j,k}$, the fL filtering for the second level computes $x1^{vL}_{j,k} = x1_{j,k} + x1_{j,k+2}$. Then in terms of the input image pixels ($x1_{j,k} = x_{j,k} + x_{j,k+1} + x_{j+1,k} + x_{j+1,k+1}$), the coefficients are $x1^{vL}_{j,k} = x_{j,k} + x_{j,k+1} + x_{j+1,k} + x_{j+1,k+1} + x_{j,k+2} + x_{j,k+3} + x_{j+1,k+2} + x_{j+1,k+3}$. Note that the 0 insertion in the filter keeps the filter kernel uniform in terms of the input image.

Continue in this manner to create higher levels of the representation. For each succeeding level, use X_vL_hL of the preceding lower level as the starting image for the filterings. Also, modify the filters by inserting zeros: at level N, insert $2^{N-1}-1$ zeros into the filters.

Typically, 3 or 4 levels give good performance. This hierarchical representation is similar to a regular wavelet representation with Haar filters, but the difference is that there is no critical downsampling in the representation. With 3 levels the representation of input image X includes 10 arrays: the 3 first level arrays X_vL_hH, X_vH_hL, and X_vH_hH, the 3 second level arrays X_vL_hL_vL_hH, X_vL_hL_vH_hL, and X_vL_hL_vH_hH, and the 4 third level arrays X_vL_hL_vL_hL_vL_hH, X_vL_hL_vL_hL_vH_hL, X_vL_hL_vL_hL_vH_hH, and X_vL_hL_vL_hL_vL_hL. Note that only the highest level needs to retain the all-low-pass-filtered array because for the other levels the LL array is further filtered to generate the next higher level arrays.

(2) Modification of the Hierarchical Representation

Modify the coefficients in each array at each level of the hierarchical representation to remove (suppress, mitigate) noise. (Do not modify the coefficients in X_vL_hL arrays.) Use the piecewise-linear mapping function shown in FIG. 2a to modify the coefficients; that is, coefficient $z_{j,k}$ is replaced by $F(z_{j,k})$ where FIG. 2a is a graph of the function F( ) in general. Note that coefficients can be either positive or negative. This mapping function is applied only to the amplitude of a coefficient, and the sign of the coefficient is preserved. In FIG. 2a the parameters change depending on the amount of noise in the image and the level of the hierarchical representation. The amount of noise is measured by the estimated standard deviation (std) of noise. At the lowest level of the representation, typically selected thresh3=4*(std of noise), thresh2=2*(std of noise), thresh1=0.2*(std of noise), value1=thresh1, and value2=0.5*thresh2. To move to the upper levels of the representation, multiply all of the parameters by a factor of 2 at each level. That is, for higher levels (which correspond to lower spatial frequencies) the thresholds become larger because the coefficients are sums and differences of prior level coefficients without renormalization. Of course, these thresholds and values could be varied; such as value1=0 and the thresholds different multiples of the noise std.

For a given image sensor, the std of noise depends on the ISO level; higher ISO levels produce more noise. Therefore, the threshold values of the noise filter should be selected according to the ISO level of the sensor during image capture. Noise std for each ISO level can be measured during product development and stored in a table inside the digital camera. Since the camera knows which ISO level is used during the capture of a particular image, it can read the expected noise std from the table and set appropriate parameters for the noise filter thresholds as described above. During product development, noise std for each ISO level can be estimated by capturing an image of an entirely flat chart and by computing the standard deviation of the pixels in the image. Noisy input images with 8-bit pixel data (0-255) commonly have std of noise as large as 15.

(3) Creation of the Final Image

Use the modified hierarchical representation from step (2) to create the final noise-filtered image. Start at the highest level of the modified representation (modified arrays denoted X_vL_hH, X_vH_hL, and X_vH_hH, plus X_vL_hL), and apply the inverse (with shift) Haar filters:

fL=[1 1]
fH=[−1 1]

which at level N, fL and fH have been modified by insertion of $2^{N-1}-1$ zeros analogous to the filter modifications in step (1).

Filter X_vL_hL vertically by fL to create X_vL_hL_vL
Filter X_vL_hL_vL horizontally by hL to create X_vL_hL_vL_hL
Filter X_vL_hH vertically by fL to create X_vL_hH_vL
Filter X_vL_hH_vL horizontally by hH to create X_vL_hH_vL_hH
Filter X_vH_hL vertically by fH to create X_vH_hL_vH
Filter X_vH_hL_vH horizontally by hL to create X_vH_hL_vH_hL
Filter X_vH_hH vertically by fH to create X_vH_hH_vH
Filter X_vH_hH_vH horizontally by hH to create X_vH_hH_vH_hH
Add (coefficient-wise) the four filtered arrays, X_vL_hL_vL_hL, X_vL_hH_vL_hH, X_vH_hL_vH_hL, and X_vH_hH_vH_hH.

Then, divide (coefficient-wise) the result by 16 to obtain Y.

After finishing the highest level, proceed to successively lower levels in the same manner. At each level, X_vL_hL is set to be equal to Y that was obtained at the preceding higher level by the inverse filtering.

After finishing the filtering, adding, and dividing at the lowest level, the resultant Y forms the final noise-filtered image.

Figure 3A:
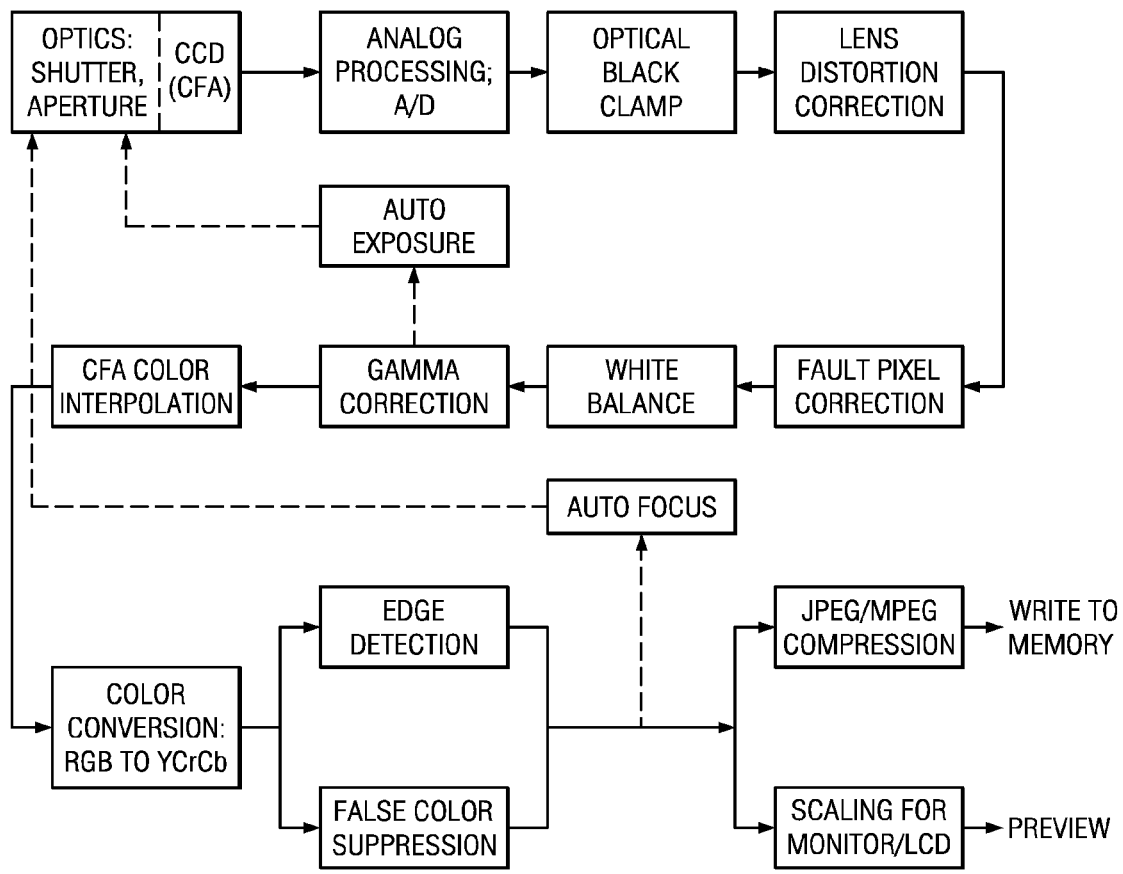
FIGS. 3a-3c show camera functional blocks and network communication.
Figure 3C:
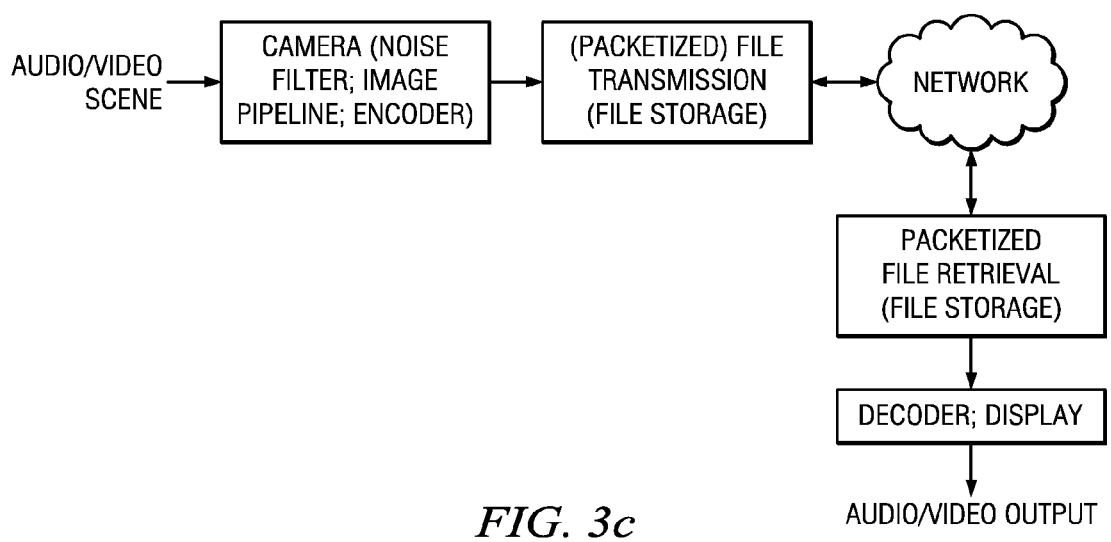
Figure 3B:
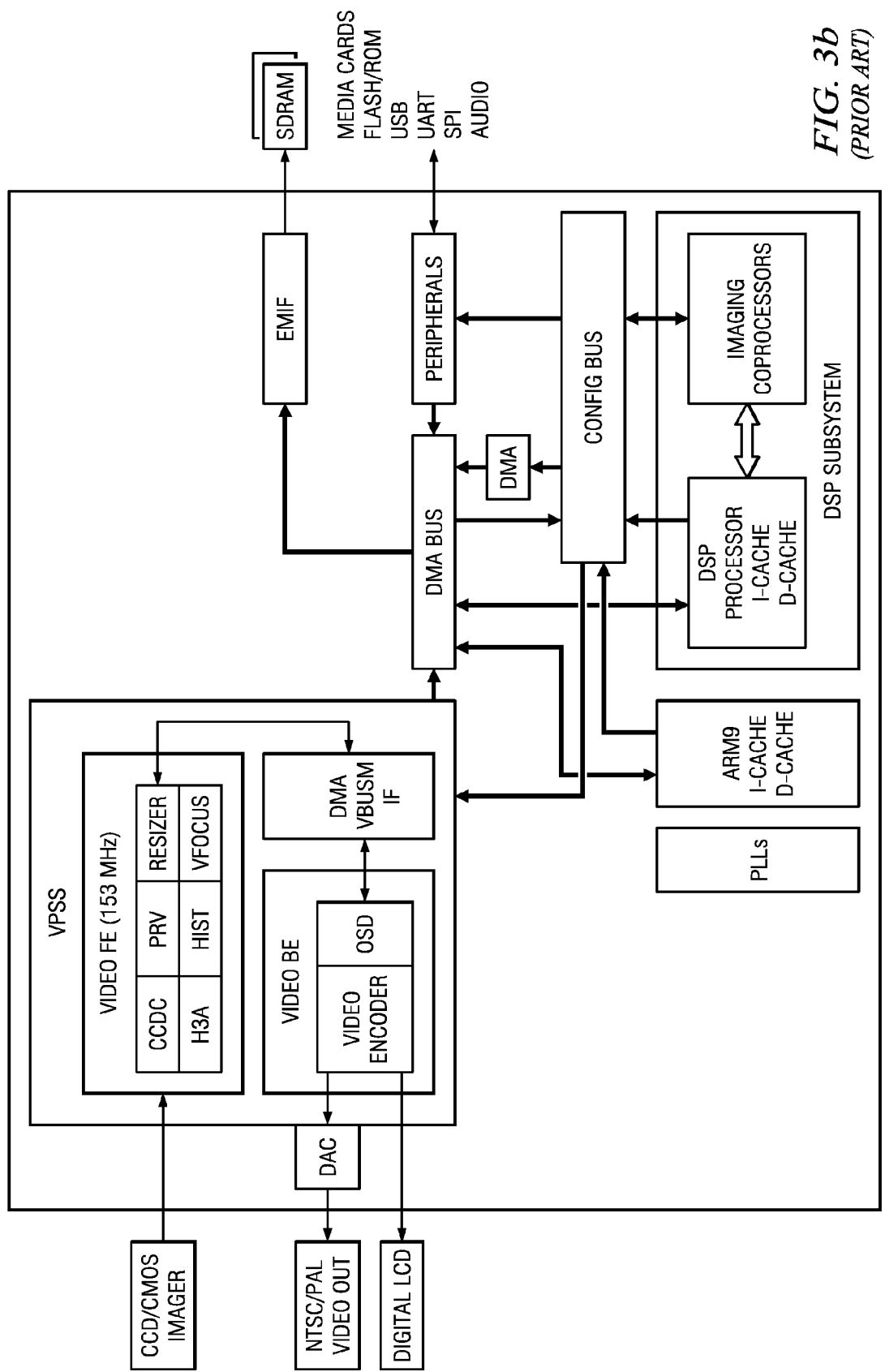

This hierarchical noise filtering scheme could be applied to the image data in any format such as Bayer, RGB, YCbCr, et cetera; these different formats appear at various places in the image pipeline of FIG. 3a. For each format, the filtering is applied to each color component separately. For example, with a Bayer pattern, each of the four color arrays (R, B, Gr, and Gb) is separately processed as an input array to give a noise-filtered Bayer pattern output after reassembly. When the filtering is applied to the Cb and Cr components, Cb and Cr can be downsampled before noise filtering and upsampled after noise filtering as shown in FIG. 1c, which reduces computational complexity. This downsampling/upsampling operation also increases the effective size of the noise filtering operation on the image, so larger patches of noise can be removed. Typically, use 2× or 4× downsampling. The drawback of this approach is the loss of detail in the Cb and Cr components during downsampling. Therefore, this operation is optional and should be used only when noise levels are very high.

3. Second Preferred Embodiments

The second preferred embodiment hierarchical noise filtering methods follow the first preferred embodiment methods but with a different function for the coefficient modification of step (2). In particular, repeat steps (1) and (3) of the section 2, but replace step (2) with the following alternative.

($2^{alt}$) Alternative Modification of the Hierarchical Representation

Figure 2B:
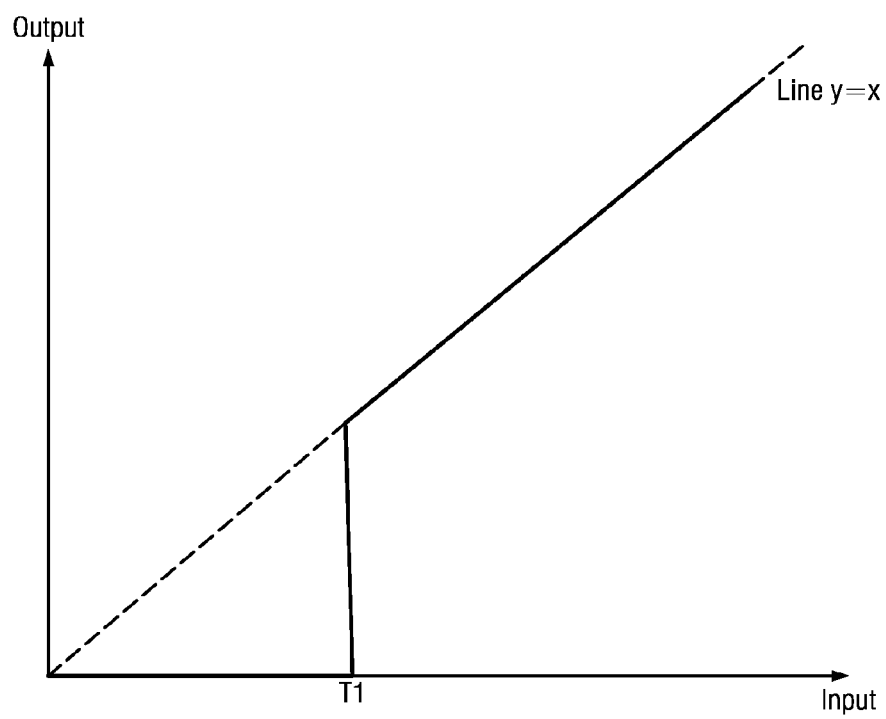

Modify the coefficients in each level of the hierarchical representation by using the mapping function shown in FIG. 2b. This function is simpler than the one described in FIG. 2a, so it may be more suitable when computation complexity reduction is a major concern. Start at level 1 and threshold the coefficients by T1. If the absolute values of the coefficients are less than the threshold, set them to zero. If the absolute values of the coefficients are larger than the threshold, leave them unchanged. The value of the threshold, T1, should be selected based on the noise standard deviation and the level of the representation. Setting the threshold to 3 to 4 times the standard deviation of noise (std of noise) at the lowest level gives good results.

Proceed to higher levels and threshold the coefficients at each level. At level N, use the threshold $2^{N+1}*T1$.

Finally, for each nonzero coefficient at the first level of the representation, count the number of nonzero coefficients in a 3×3 neighborhood; if the number of nonzero neighbors is less than a threshold T2, set the coefficient to zero. Taking T2 to 2 works well.

4. Third Preferred Embodiments

The third preferred embodiment hierarchical noise filtering methods follow the first or second preferred embodiments for steps (1) and (2) or ($2^{alt}$), and then replace step (3) with the following alternative step.

($3^{alt}$) Alternative Creation of the Final Image

Use the modified hierarchical representation from step (2) or ($2^{alt}$) to create the final noise-filtered image. For each coefficient, compute the difference between the modified value from step (2) or ($2^{lat}$) and the original value in the level. Replace each coefficient with this difference value. For example, if step (1) computed an original value of a coefficient as 10 and step (2) modified the value to 2, then change the value to 8. Next, start at the highest level of the modified representation (modified arrays denoted X_vL_hH, X_vH_hL, and X_vH_hH, plus X_vL_hL), and apply the inverse (with a shift) Haar filters:

fL=[1 1]
fH=[−1 1]

where at level N, fL and fH have been modified by insertion of $2^{N-1}-1$ zeros.).

Filter X_vL_hH vertically by fL to create X_vL_hH_vL
Filter X_vL_hH_vL horizontally by hH to create X_vL_hH_vL_hH
Filter X_vH_hL vertically by fH to create X_vH_hL_vH
Filter X_vH_hL_vH horizontally by hL to create X_vH_hL_vH_hL
Filter X_vH_hH vertically by fH to create X_vH_hH_vH
Filter X_vH_hH_vH horizontally by hH to create X_vH_hH_vH_hH
Add X_vL_hH_vL_hH, X_vH_hL_vH_hL, and X_vH_hH_vH_hH.

Then, divide the result by 16 to obtain Y.

Note that X_vL_hL is not processed at the highest level because X_vL_hL coefficients are not modified in step (2) or ($2^{lat}$), so the differences from the original values are always zero.

For the next lower level of the representation, set X_vL_hL to be equal to Y from the highest level and use the following procedure:

Filter X_vL_hL vertically by fL to create X_vL_hL_vL
Filter X_vL_hL_vL horizontally by hL to create X_vL_hL_vL_hL
Filter X_vL_hH vertically by fL to create X_vL_hH_vL
Filter X_vL_hH_vL horizontally by hH to create X_vL_hH_vL_hH
Filter X_vH_hL vertically by fH to create X_vH_hL_vH
Filter X_vH_hL_vH horizontally by hL to create X_vH_hL_vH_hL
Filter X_vH_hH vertically by fH to create X_vH_hH_vH
Filter X_vH_hH_vH horizontally by hH to create X_vH_hH_vH_hH
Add (coefficient-wise) the four images X_vL_hL_vL_hL, X_vL_hH_vL_hH, X_vH_hL_vH_hL, and X_vH_hH_vH_hH.

Then, divide (coefficient-wise) the result by 16 to obtain Y.

After finishing this second-highest level, proceed to successively lower levels in the same manner. At each level, X_vL_hL is set equal to Y that was obtained at the preceding higher level.

After finishing the filtering at the lowest level, subtract Y from the original input image. Note that Y in this case represents the noise we want to remove from the image; therefore, we subtract it from the input image.

Of course, both step (3) (additive approach) and step ($3^{alt}$) (subtractive approach) methods of implementation of inverse filtering produce the exact same output. However, the subtractive method is more convenient to implement in certain cases because this method makes it possible to skip thresholding at certain levels without any additional computation. For example, if a one-level noise filter has been applied to the image at an earlier place in the system and the goal was to apply the second and third levels of a three-level noise filter, the first level thresholding could be skiped without any computation. This is possible because if the first level coefficients are not modified, their difference from the original coefficients will be zero. Then, in the subtractive method, their contribution to Y will be zero, so they need not be processed. However, in the additive method, first level coefficients will be nonzero and will contribute to the output, so the first level coefficients need to be processed to produce the correct Y even if they had not been modified.

5. Experimental Results

Figure 4A:
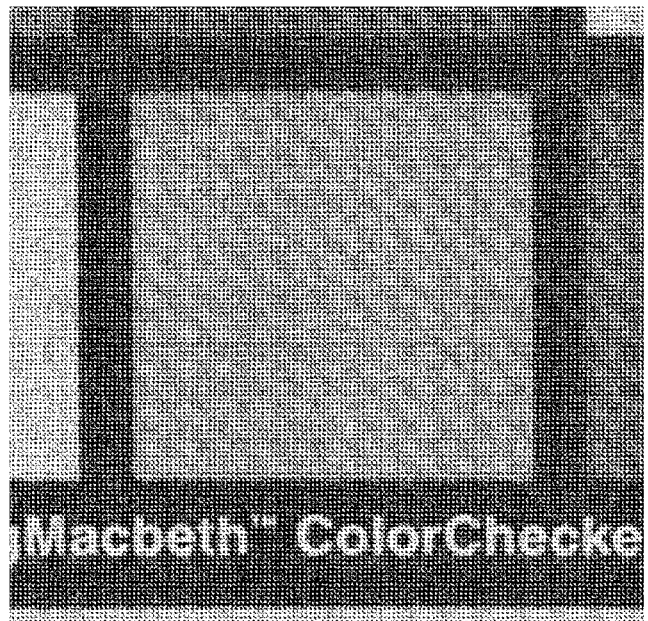
FIGS. 4a-4b illustrate experimental results.
Figure 4A:
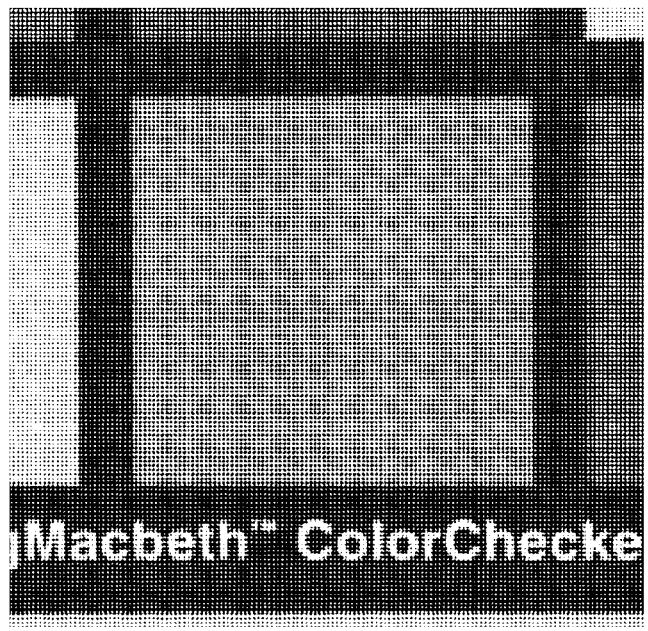
Figure 4B:
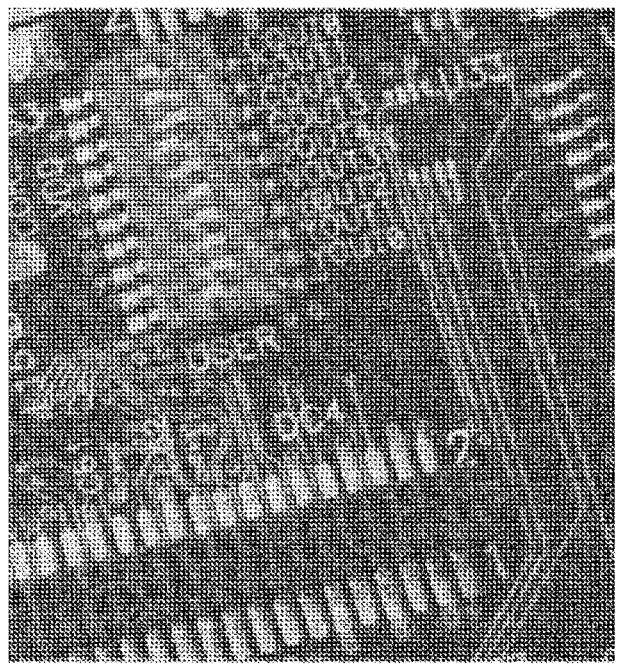
Figure 4B:
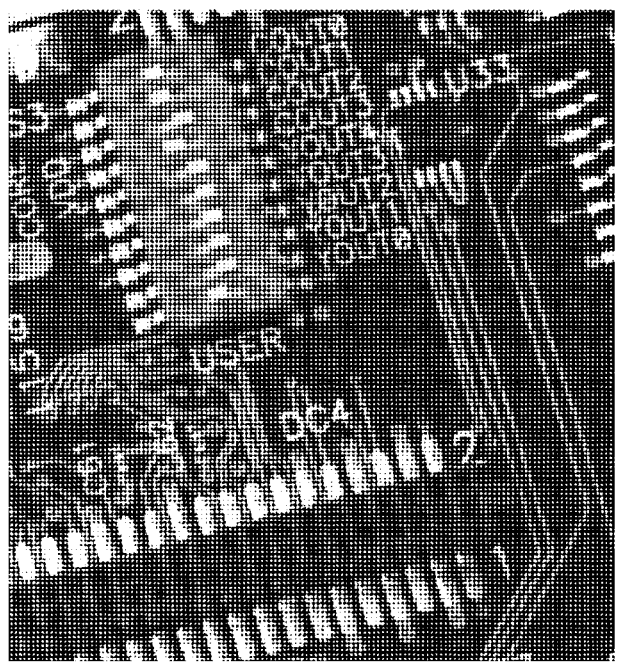

FIGS. 4a-4b illustrate experimental results: the upper panel of each FIG. shows a portion of an input image, and the lower panel shows the same portion after application of a preferred embodiment method of hierarchical noise filtering.

6. Modifications

The preferred embodiments may be modified in various ways while retaining the feature of hierarchical coefficient mapping/thresholding to provide noise reduction with edge preservation.

For example, the function for coefficient modification (mapping or thresholding) could be varied while still making all small amplitudes equal at each level; other simple filters could be used to generate the hierarchical representation; the input image and the arrays at each level can be padded in various ways to provide for boundary pixel and coefficient filtering, such as replication or periodic; and so forth.

What is claimed is:

1. A method of a signal processor for image noise filtering, comprising the steps of:
   (a) forming, in the signal processor, a hierarchical representation of an input image that has not been downsampled by successive high-pass and low-pass filtering of said image to give a plurality of coefficient arrays in each of a plurality of levels, wherein the high-pass filter and low-pass filter is;
   (b) modifying said coefficients of each of said coefficient arrays to give modified coefficient arrays, wherein said modifying said coefficients is by mapping said coefficients with a piecewise linear function; and (c) inverse filtering each of said modified coefficient arrays and combining said inverse-filtered modified coefficient arrays to give a noise-filtered version of said input image, wherein said forming a hierarchical representation of an input image separately filters arrays of color components of said input image, and wherein when said arrays of color components are luminance array plus chrominance arrays, said chrominance arrays are downsampled prior to filtering.

2. The method of claim 1, wherein said modifying said coefficients is by thresholding said coefficients.

3. A digital camera, comprising:
(i) a sensor;
(ii) an image pipeline coupled to said sensor; and
(iii) an image noise filter coupled to said image pipeline, said image noise filter operable to:
(a) forming a hierarchical representation of an input array that has not been downsampled by successive high-pass and low-pass filtering of said array to give a plurality of coefficient arrays in each of a plurality of levels, wherein the high-pass filter [1,-1] and low-pass filter is [1,1];
(b) modifying said coefficients of each of said coefficient arrays to give modified coefficient arrays, wherein said modifying said coefficients is by mapping said coefficients with a piecewise linear function; and
(c) inverse filtering each of said modified coefficient arrays and combining said inverse-filtered modified coefficient arrays to give a noise-filtered version of said input array.

\* \* \* \* \*